T. A. NELSON.
VALVE.
APPLICATION FILED FEB. 14, 1911.
1,050,225.
Patented Jan. 14, 1913.
2 SHEETS—SHEET 1.
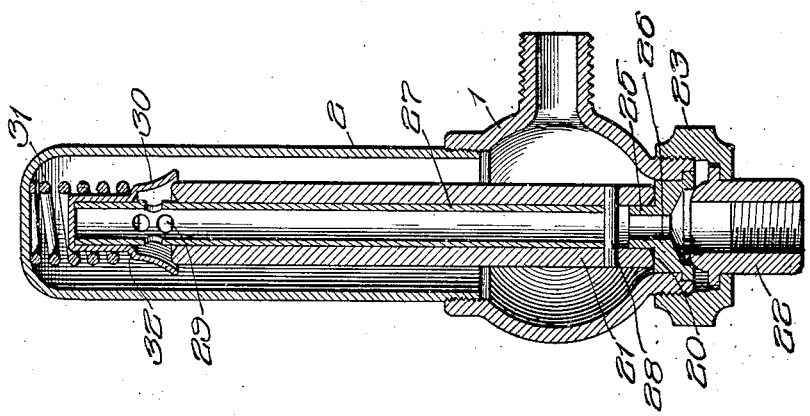
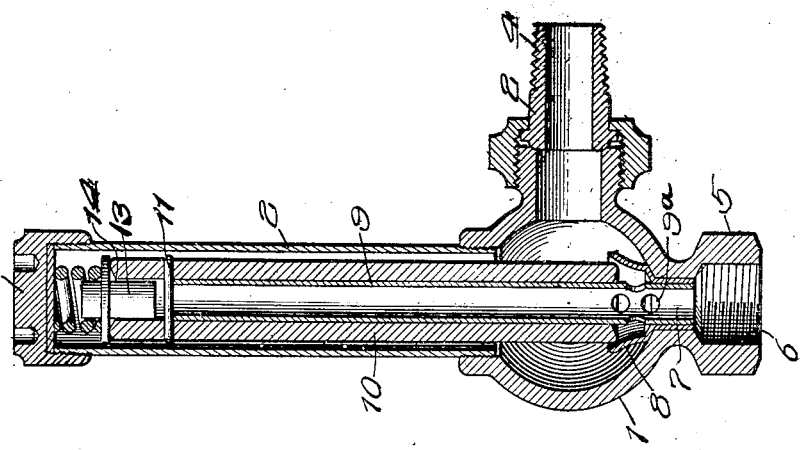
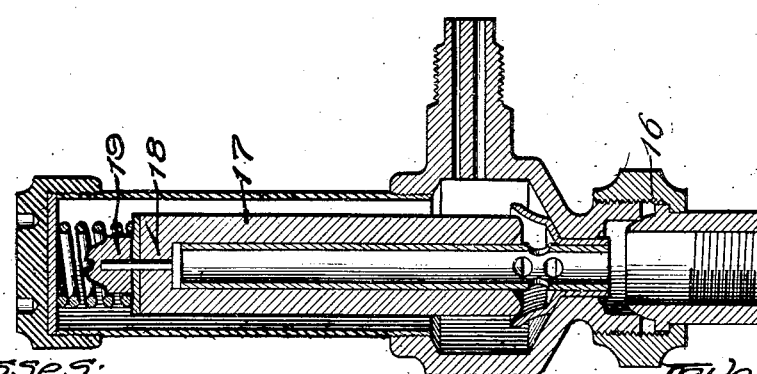
Witnesses:
Inventor:
Thomas A. Nelson.

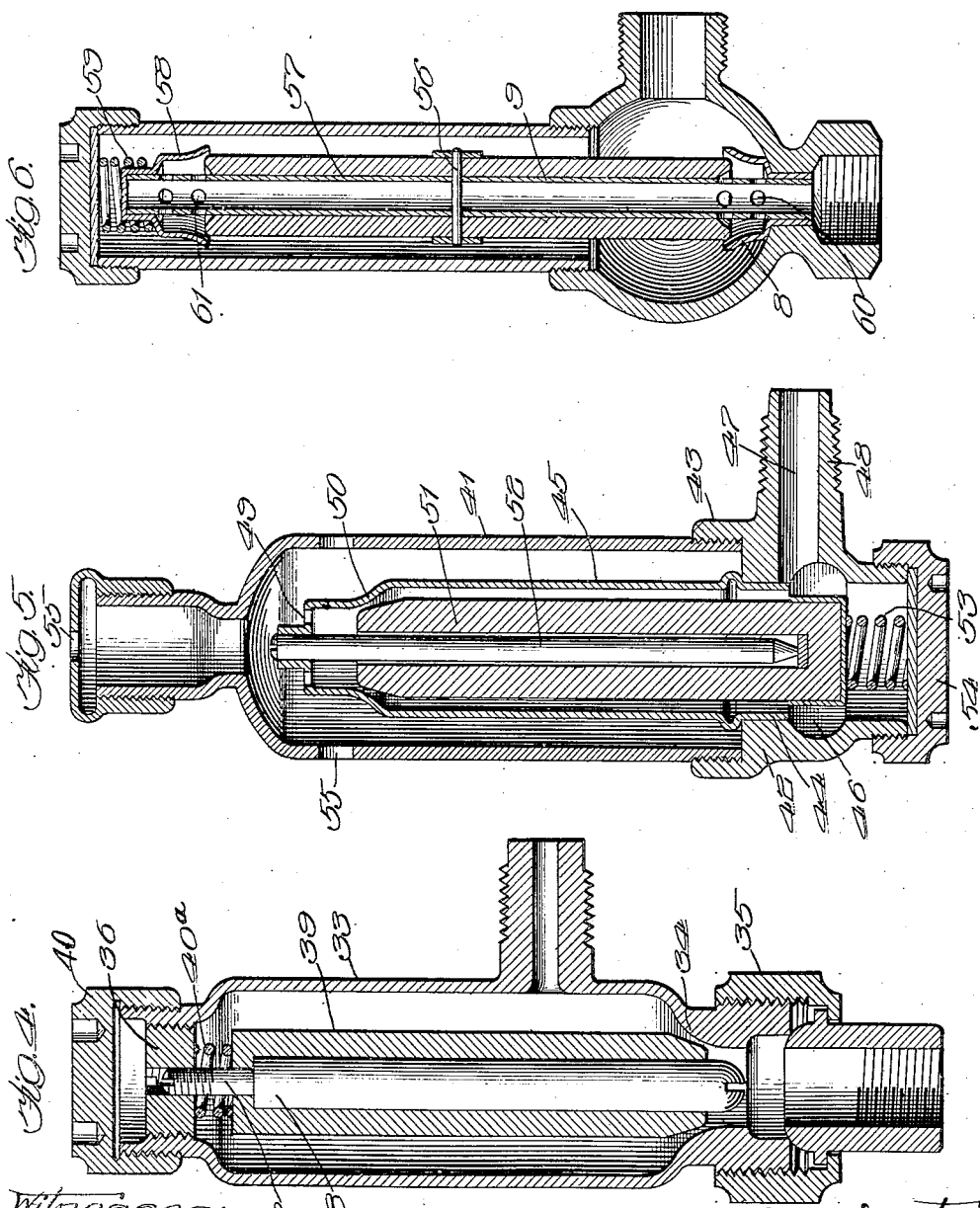

UNITED STATES PATENT OFFICE.

THOMAS A. NELSON, OF CHICAGO, ILLINOIS.

VALVE.

1,050,225.	Specification of Letters Patent.	Patented Jan. 14, 1913.

Application filed February 14, 1911. Serial No. 608,515.

*To all whom it may concern:*

Be it known that I, THOMAS A. NELSON, a citizen of the United States, residing at Chicago, in the county of Cook and State of Illinois, have invented new and useful Improvements in Valves, of which the following is a full, clear, concise, and exact description, reference being had to the accompanying drawing, forming a part of this specification.

My invention relates to relief valves for radiators, such as are employed with heating plants, either steam or hot water.

The object of my invention is to provide a valve in which the thermostatic element may expand unobstructedly even after it has closed the vent valve.

Heretofore in air vent valves for radiators, the thermostatic element, which is arranged to close the air outlet, has been so mounted in the valve casing that after the outlet port has been closed any continued expansion on the part of the thermostatic element will result in injury either to the thermostatic element itself or to other portions of the valve. In order to overcome this difficulty it has been customary heretofore to so arrange the thermostatic element that it will close the valve only after the limit of expansion has been reached, the result being that while the radiator may be hot, if the steam therein is not hot enough to fully expand the thermostatic element, the valve will leak. By the construction of a valve in accordance with my invention the thermostatic element may be arranged to close the valve at any point, and if it continues to expand due to an increase in heat, no damage will result.

For the purpose of disclosing my invention I have shown in the accompanying drawings a number of valves embodying the same. It will be understood, however, that while I have shown a number of valves all embracing my invention, my invention may be variously applied and various modifications may be made therein without departing from the spirit thereof as set forth in the appended claims.

In the drawings I have illustrated in Figures 1 to 6 sectional views of various valves embodying my invention.

The preferred form of valve embodying my invention I have illustrated in section in Fig. 2. A valve of the construction illustrated in this figure comprises an inclosing casing which may be formed of two sections 1 and 2, the section 1 being preferably formed of cast metal and the section 2 being preferably a metallic tube adapted to screw into this section 1. The section 1 of the casing is provided with a laterally extending stem 3 screw-threaded as at 4 to screw into the opening formed in the radiator. A bottom stem 5 is also formed on the section 1 and this stem is internally screw-threaded as at 6 to receive the threaded end of the return or vacuum pipe, the form of valve illustrated in Fig. 2 being particularly adapted for use with what is known as the vacuum system of steam heating. An opening 7 is formed in the bottom of the section 1 of the casing and arranged therein is a valve seat 8. This seat comprises a bell-shaped seat portion which is contracted at its smaller end to form a tubular extension fitting in the opening 7. Extending vertically in the valve casing is a tubular support 9 which is secured in position by being fitted in the lower end of the valve seat 8 and is provided with a number of holes $9^a$ communicating with the opening 7. The thermostatic element 10 for closing the opening 7 is tubular in form and is constructed of a composition adapted to expand and contract under the influence of heat and cold. This composition may be the vulcanite composition which is well known in the art or may be any other composition desired. At the upper end of the tubular thermostatic element is arranged a transverse pin 11 adapted to rest upon the top of the tube 9 when the thermostatic element is contracted and hold the lower end of the thermostatic element out of engagement with the valve seat 8. In order that the thermostatic element 11 may be held more or less firmly in position and the pin 11 held in close engagement with the top of the tube 9, I provide a small plug 13 having a shoulder 14 thereon. One end of this plug fits into the upper end of the thermostatic element 11 and a coiled spring fits over the upper end of the plug and bears on the shoulder 14, the opposite end of the coiled spring being arranged to engage with the under side of a closing cap 15 of the casing. The operation of this device is very clearly understood. When the thermostatic element is cold or contracted the lower end of the element is out of engagement with the seat 8, due to the fact that the thermostatic element is supported on the top of the tube 9. When steam is admitted to the radiator the cold air and water of condensation is sucked out of the radiator and through the openings in the tube 9 through the opening 7 and down into the vacuum pipe connected to the lower end with the casing section 1. As soon as the hot steam commences to pass through the casing of the valve the thermostatic element will commence to expand and will lengthen downwardly until it seats itself on the seat 8, thereby closing the outlet to the vacuum pipe. If the thermostat continues to expand the expansion will now be in the opposite direction and will be unobstructed.

The valve illustrated in Fig. 1 of the drawing is very similar in construction to the valve illustrated in Fig. 2 with the exception of certain details, the principal difference being that a different form of coupling, as at 16, is used for connecting the valve to the vacuum pipe and a tubular thermostatic element 17 having its upper end closed, as at 18, is used. The upper end of the thermostatic element being closed the pin 11, shown in Fig. 2, is dispensed with. Secured to the upper end 18 of the thermostatic element is a small projection or boss 19 over which the coiled spring is adapted to fit. It will be noted in the two valves illustrated in Figs. 1 and 2 that the thermostatic element 10 may be readily renewed by merely opening the cap 15 and withdrawing the thermostatic element and dropping a new one in its place. This may be done readily without destroying any of the connections between the valve and the vacuum pipe and radiator.

The valve illustrated in Fig. 3 is so constructed that the entire apparatus may be removed from the casing through the bottom. In this construction the two-part casing is still maintained with the exception that the section 2 of the casing instead of having a removable cap has its top formed integrally with the sides. Arranged in the bottom of the casing section 1 of this structure is a support 20 for the thermostatic element 21. This support is preferably held in position by means of its engagement with the top of the vacuum pipe 22 which is connected to the valve by the nut 23. The upper end of this support is provided with a projection 25 over which the lower end of the thermostatic element 21 is adapted to fit and is provided with a central opening 26 which leads to the vacuum pipe. Arranged within the tubular thermostatic element 21 is a tube 27 which is adapted to rest at its lower end on a pin 28 passing through the thermostatic element. The upper end of this tube is provided with a number of small ports 29 through which the air from the radiator may escape, and fitting over the top of the tube is a cup-shaped device 30 which forms a valve seat for the upper end of the thermostatic element. This cup-shaped device is held down on the top of the tube 29 by means of a coiled spring 31 which engages the top of the casing section 2 and a shoulder 32 on the seat. In the operation of this device, with the thermostatic element contracted the air passes in the casing 2 and out through the openings 29, down through the tubular member 27 arranged within the thermostatic element, and thence out through the opening 26. When the thermostatic element commences to expand it will expand upwardly, the support 20 forming a stationary point at its lower end. As soon as the upper end of the thermostatic element seats in the seat 30 the openings 29 will be closed but the thermostatic element may continue to expand practically unobstructedly upwardly due to the fact that the coiled spring, while holding the seat on the upper end of the thermostatic element, will give sufficiently to form practically no obstruction to the expansion of the thermostatic element. In event it is desired to remove the parts of the valve within the casing in the structure illustrated in Fig. 3, the lower nut 23 may be disconnected, when all of the parts of the valve will drop down with the bottom support 20. This arrangement permits the ready removal of the parts from the bottom of the valve casing and renewal of any of the parts which may become worn or inoperative through any cause whatever.

In the construction illustrated in Fig. 4 I have shown means whereby the thermostatic element may be adjusted relatively to the valve seat. In this structure I have illustrated the casing 33 as being formed from one piece of material, although this is not necessary. The lower end of this casing is drawn in to form a neck having an outlet port 34. This neck is screw-threaded to receive a coupling nut 35 adapted to connect the valve with the vacuum pipe. The upper end of the casing 33 is likewise contracted to form a neck which is internally screw-threaded to receive a plug 36, which in turn is threaded to receive the threaded end of a pin 37. This pin is made larger at a short distance from its end, as at 38, and is adapted to fit in the tubular thermostatic element 39, the upper end of the element having a suitable opening therein through which the pin 37 is adapted to pass. The top of the casing is covered by a cap 40 to properly inclose the parts and prevent unnecessary tampering with the adjusting screw 37. Interposed between the plug 36 and the top of the thermostatic element 39 is a coiled spring 40$^a$, which holds the thermostatic element down on the shoulder formed on the pin 38. It will be readily seen that when the thermostatic element expands under the influence of heat, the expansion will cause its lower end to engage the valve seat formed at the port 34 and close the opening against the further passage of steam. If, after seating, the thermostatic element continues to expand, the expansion will take place in an upward direction and no damage will take place. By operating the screw-threaded pin 37, the thermostatic element may be adjusted relatively to the valve seat formed by the port 34, if desired.

The valve illustrated in Fig. 5 is especially adapted for use on steam radiators of the single pipe system of steam heating. In this construction it will be noted that there is no connection to a return or vacuum pipe. The valve illustrated in the drawing comprises a casing formed of a tubular drawn section 41 and a cast section 42. The cast section has formed thereon an annular flange 43, into which the lower end of the tubular section 41 is adapted to be screwed. This cast section 42 is provided with a horizontal web 44, having a central aperture into which fits the lower end of an interior tube 45, which connects with a chamber 46 formed in the section 42, and this chamber connects with an inlet port 47 formed in the stem 48 by which the valve is secured to the steam radiator. The upper end of the interior tube 45 has formed therein escape ports 49 and is contracted to form a valve seat 50. Arranged within the tube 45 is a thermostatic element 51, the upper end of which is adapted, when the element is expanded by the heat, to seat on the valve seat 50. This thermostatic element is of tubular form and fits over a pin 52, the upper end of which is screwed into the top of the tube 45 and the lower end of which abuts against the closed end of the tubular thermostatic element to hold the thermostatic element, when cold, away from the valve seat 50. The thermostatic element is held up in position against this pin 52 by means of a coiled spring 53, which is interposed between the bottom of the thermostatic element and the removable bottom 54 of the exterior casing. The exterior casing is provided with suitable ports 55, which lead to the atmosphere. In operation, when the steam is first turned on to the radiator, the cold air in the radiator escapes through the port 47 up through the tube 45, the ports 46, and then passes out to the atmosphere through the ports 55. When the thermostatic element becomes heated by the steam in the radiator, it expands until it seats against the seat 50, thereby closing the ports 49 so that steam cannot pass to the atmosphere, and if the thermostatic element continues to expand after it has seated, the expansion will be taken up by the coiled spring 53 at the lower end.

The valve illustrated in Fig. 6 is provided with two, instead of one, eduction ports. In this construction, the thermostatic element is adapted to close two valves. The valve casing is substantially the construction shown in Fig. 2 and is provided with a valve seat similar to that shown in Fig. 2. The thermostatic element, however, is made much longer, comparatively, and is provided at about its center with a cross pin 56, adapted to rest upon, when the thermostat is contracted, the top of the tube 9. Arranged in the upper portion of the thermostatic element is a second tube 57, the lower end of which rests upon the cross pin 56, and fitted over this upper tube is a valve seat 58, held in position by a spring 59, in substantially the same manner as the valve seat 30 illustrated in Fig. 3. When steam is first admitted to the thermostat, the cold air not only passes out through the lower openings 60 in the tube 9, but also passes out through openings 61 in the top of the tube 57. When the thermostatic element commences to expand under the influence of the heat, it expands downwardly, seating on the seat 8 and closing the lower opening 60, and at the same time expands upwardly, seating on the seat 58 and closing the upper openings 61.

It will be seen from the description of the various valves which I have described and which embody my invention that the thermostatic element can always expand freely after the valve has been closed.

Having thus described my invention, what I claim as new and desire to secure by Letters Patent, is:

1. In a device of the character described, the combination with a seat, of a stem rigidly supported relatively thereto, a thermostatic valve member surrounding said stem and having one end arranged to engage in said seat and being free to unobstructedly expand after seating, and a stop on said stem against which the thermostatic member contracts.

2. In a device of the character described, the combination with an inclosing casing having a restricted neck, of a cup-shaped valve seat supported in said neck, a hollow supporting stem supported in said neck and adapted to extend upwardly therefrom, and a hollow thermostatic valve member fitting over said stem and supported thereby, the lower end of said valve member being arranged to engage in the direction of pressure, when the valve member is expanded, said cup-shaped seat, the upper end of said valve member being free to continue to expand after the valve member has seated, said supporting stem being arranged to form a stop against which the thermostatic member contracts.

3. In a device of the character described, the combination with an inclosing casing, of a valve seat supported therein, a stem rigidly extending from said valve seat, a hollow thermostatic element supported on said stem and having one end thereof arranged to engage in the direction of pressure, the valve seat and the other end freely movable to permit the same to continue to expand after the thermostatic element has seated, said stem forming a rigid stop against which the thermostatic element is arranged to contract.

4. In a device of the character described, the combination with a valve seat, of a supporting and guiding stem rigidly mounted relatively thereto, and a hollow thermostatic element supported on said guiding stem and having both ends free to move, said stem having a portion thereof arranged to act as a stop against which the thermostatic element contracts.

In witness whereof, I have hereunto subscribed my name in the presence of two witnesses.

THOMAS A. NELSON.

Witnesses:
E. R. KING,
W. PERRY HALEY.